(12) United States Patent
Inoue (10) Patent No.: US 7,864,928 B2
(45) Date of Patent: Jan. 4, 2011

(54) INFRARED COMMUNICATION RECEIVER

(75) Inventor: Takahiro Inoue, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 1169 days.

(21) Appl. No.: 11/508,259

(22) Filed: Aug. 23, 2006

(65) Prior Publication Data

US 2007/0047961 A1    Mar. 1, 2007

(30) Foreign Application Priority Data

Aug. 29, 2005    (JP)    ............... 2005-248246

(51) Int. Cl.
*H04B 10/00* (2006.01)
(52) U.S. Cl. .................. 379/56.1; 379/55.1; 379/90.01; 375/353
(58) Field of Classification Search ................ 379/56.1, 379/55.1, 90.01, 90.05; 327/172–178; 375/353, 375/238; 341/153
See application file for complete search history.

(56) References Cited

U.S. PATENT DOCUMENTS 3,800,273 A * 3/1974 Rolle .......................... 367/105

| 2004/0062362 | A1 | 4/2004 | Matsuya |
| 2005/0087688 | A1 | 4/2005 | Yokogawa et al. |

FOREIGN PATENT DOCUMENTS

| JP | 3-117912 A | 5/1991 |
| JP | 4-101521 A | 4/1992 |
| JP | 7-254719 A | 10/1995 |
| JP | 8-47252 A | 2/1996 |
| JP | 2002-296023 A | 10/2002 |
| JP | 2004-135321 A | 4/2004 |
| JP | 2005-130088 | 5/2005 |

\* cited by examiner

*Primary Examiner*—Melur Ramakrishnaiah
(74) *Attorney, Agent, or Firm*—Birch, Stewart, Kolasch & Birch, LLP (57) ABSTRACT

In order to adjust and decrease an acoustic pressure of a speaker driven based on an audio signal, an infrared communication receiver includes: a receiving section for receiving via infrared communication an audio signal representing audio data; and a speaker driving section for driving a speaker based on the audio signal received by the receiving section. The receiving section includes: a receiving block for receiving the audio signal; and a pulse width expanding and compressing section for expanding or compressing a pulse width of the audio signal received by the receiving block.

6 Claims, 9 Drawing Sheets

INFRARED COMMUNICATION RECEIVER

This Nonprovisional application claims priority under 35 U.S.C. §119(a) on Patent Application No. 248246/2005 filed in Japan on Aug. 29, 2005, the entire contents of which are hereby incorporated by reference.

FIELD OF THE INVENTION

The present invention relates to an infrared communication receiver, particularly to an infrared communication receiver which receives audio data by wireless.

BACKGROUND OF THE INVENTION

In recent years, devices for processing digital audio signals have been actively developed. Accordingly, techniques related to digital audio signals for connecting devices have also been actively developed. With the movement toward downsizing of the devices such as portable telephones, consideration has been given to reducing the number of components.

There has been proposed a system in which 1 bit data array modulated by PDM method (Pulse Density Modulation) is transferred when audio data is communicated by an infrared data communicating device that conforms to the global standard for infrared data communication, i.e., IrDA (Infrared Data Association) (e.g. see Japanese Unexamined Patent Publication No. 135321/2004 (Tokukai 2004-135321, publication date: Apr. 30, 2004 (Patent Document 1)).

Figure 10:
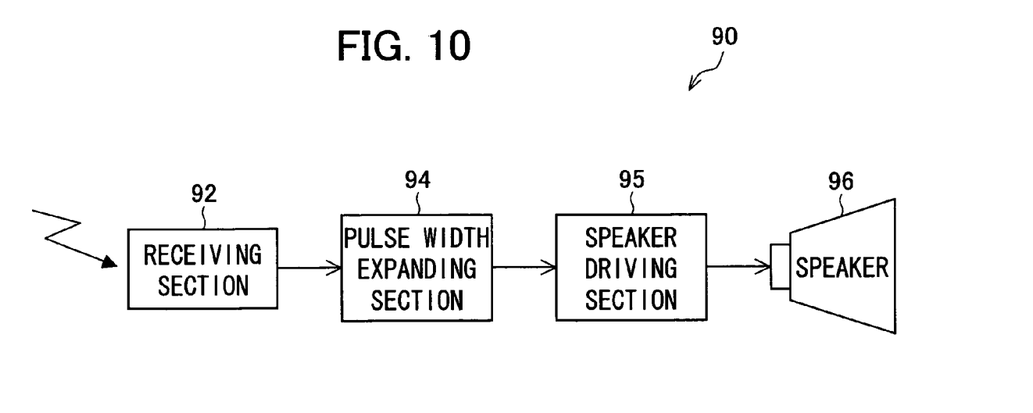
FIG. 10 is a block diagram illustrating a conventional infrared communication receiver.

FIG. 10 is a block diagram illustrating a conventional infrared communication receiver 90. The infrared communication receiver 90 includes a receiving section 92. The receiving section 92 receives via infrared communication an audio signal, which is represented by 1 bit data array modulated by PDM method. Then, the receiving section 92 provides the data thus modulated to a pulse width expanding section 94. The pulse width expanding section 94 expands a pulse width of the audio signal received from the receiving section 92, and provides the audio signal to a speaker driving section 95. Based on the audio signal thus expanded by the pulse width expanding section 94, the speaker driving section 95 drives a speaker 96.

Figure 11:
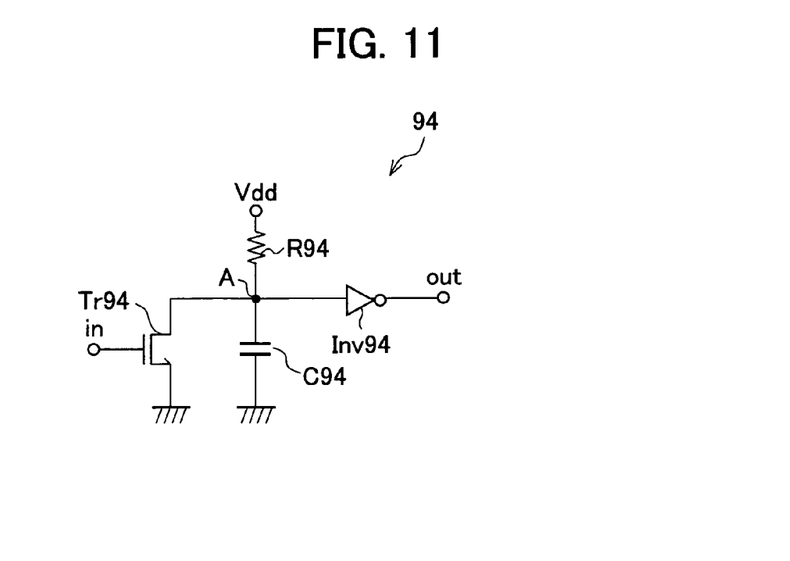
FIG. 11 is a circuit diagram illustrating a schematic of the pulse width expanding section provided in the infrared communication receiver.
Figure 12:
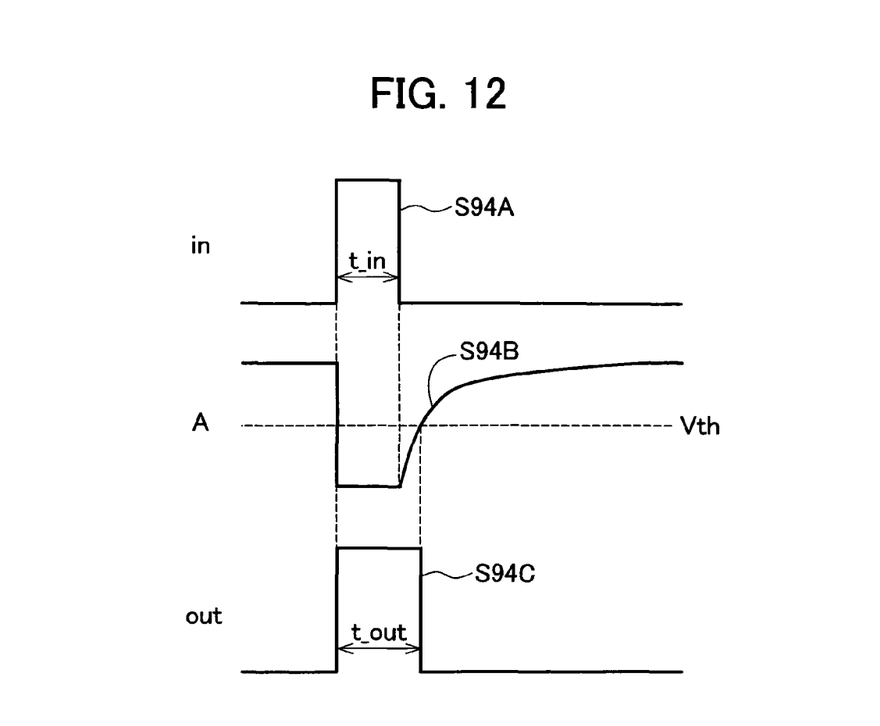
FIG. 12 is a wave form chart representing operation of the pulse width expanding section.

FIG. 11 is a circuit diagram illustrating a schematic of the pulse width expanding section 94, and FIG. 12 is a wave form chart representing its operation. The pulse width expanding section 94 includes a transistor Tr94, a resistor R94, a capacitor C94, and an inverter Inv94. A drain of the transistor Tr94, one end of the resistor R94, one end of the capacitor C94, and an input of the inverter Inv94 are connected to one another at a point A. The other end of the resistor R94 is connected to a terminal via which a power supply voltage Vdd is supplied. Further, the other end of the capacitor C94 and a source of the transistor Tr94 are connected to ground.

When an audio signal S94A having a pulse width of t_in is supplied to a gate of the transistor Tr94, an audio signal S94C is outputted from the inverter Inv94, based on an intersection of a signal S94B generated at the point A and a threshold voltage Vth of the inverter Inv94. The audio signal S94C has a pulse width t_out, which is longer than the pulse width t_in.

In this case, the pulse width is expanded by the following equation:

$$\text{Pulse width } t\_out = t\_in + C \times R \times \ln(Vdd/Vth),$$

where t_in is a pulse width of the inputted audio signal S94A, and Vth is a threshold voltage Vth of the inverter Inv94.

As such, by expanding the pulse width of an audio signal in the pulse width expanding section 94 so as to increase a density of a pulse, a higher acoustic pressure can be obtained.

Figure 13:
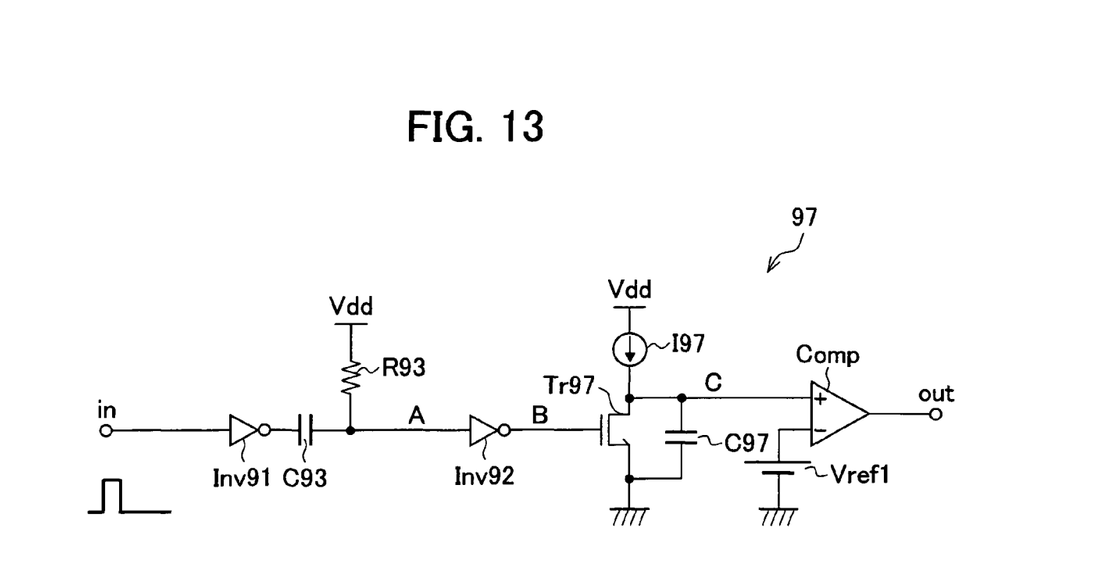
FIG. 13 is a diagram illustrating a circuitry of a conventional monostable multivibrator.
Figure 14:
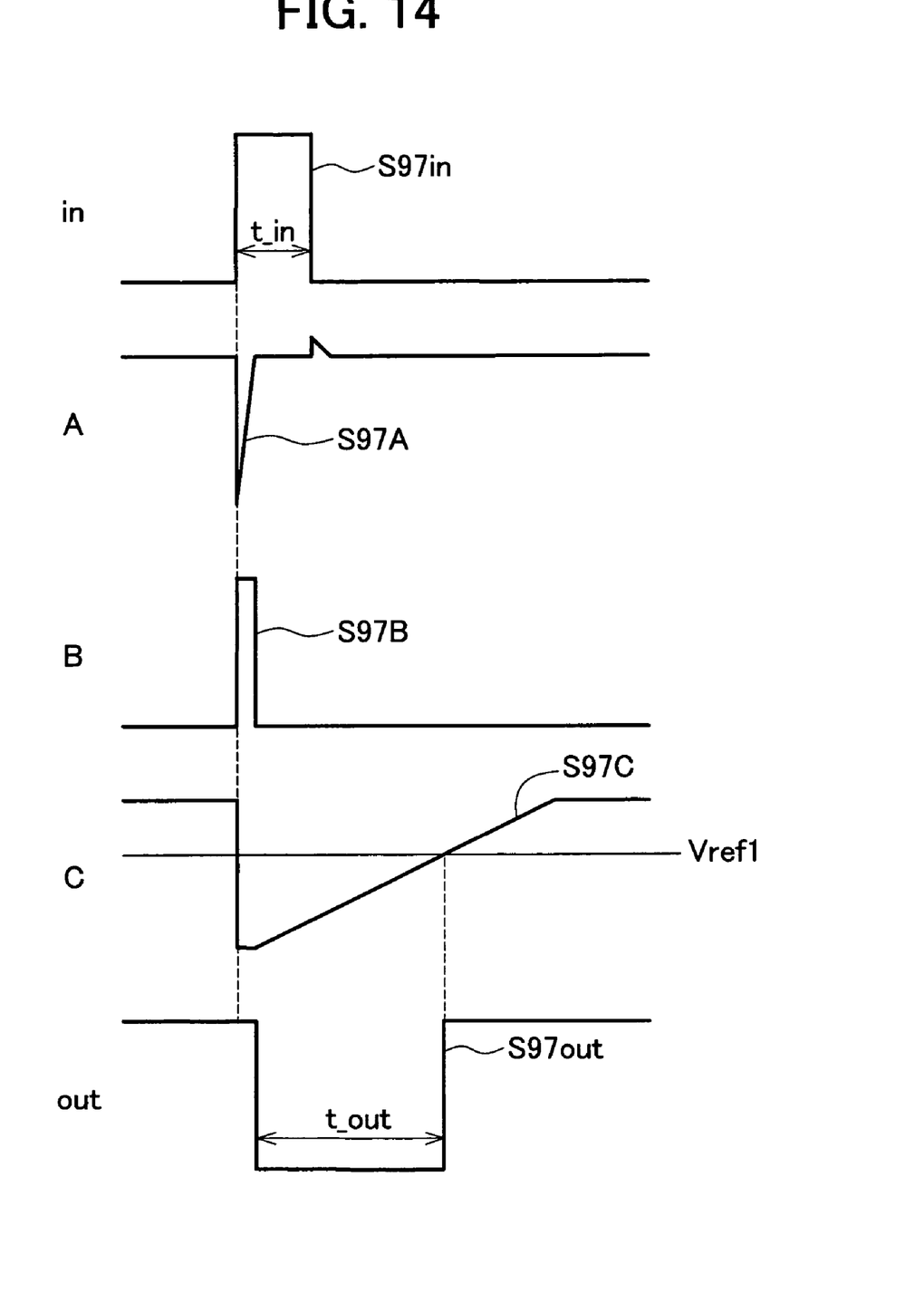
FIG. 14 is a wave form chart representing operation of the monostable multivibrator.

FIG. 13 is a circuit diagram illustrating a circuitry of a conventional monostable multivibrator 97, and FIG. 14 is a wave form chart representing its operation. The monostable multivibrator 97 includes an inverter Inv91, via which an audio signal is supplied. The output of the inverter Inv91 is connected to a capacitor C93. Opposite the inverter Inv91 relative to the capacitor C93, an inverter Inv92 and a resistor R93 are mutually connected in parallel. Further, at an opposed location to the capacitor C93, the resister R93 is connected to a terminal via which a power supply voltage Vdd is supplied.

On the output side of the inverter Inv92 are provided a transistor Tr97, a constant current I97, a capacitor C97, and a comparator Comp. A drain of the transistor Tr97, one end of a constant current I97, one end of a capacitor C97, and a non-inverting input terminal of the comparator Comp are connected to one another through a line C. The other end of the constant current I97 is connected to a terminal via which a power supply voltage Vdd is supplied, and the other end of the capacitor C97 and a source of the transistor Tr97 are connected to the ground. Further, an inverting input terminal of the comparator Comp is connected to a constant voltage source Vref1.

When an audio signal S97 in having a pulse width t_in is inputted to the inverter Inv91, a rising edge of an input pulse of the audio signal S97 in is detected, and a pulse signal S97A is outputted to the inverter Inv92 through a line A which connects the capacitor C93 and the inverter Inv92. Based on the pulse signal S97A, the inverter Inv92 generates a gate pulse S97B, and outputs it to a gate of the transistor Tr97. In response to the gate pulse S97B as a switch, a signal S97C having a waveform represented in FIG. 14 is inputted to the non-inverting input terminal of the comparator Comp through the line C. Then, the comparator Comp compares the signal S97C with the constant voltage source Vref1, so as to generate a signal S97out having a pulse width t_out. The pulse width t_out is found by the following equation:

$$\text{Pulse width } t\_out = tg + C97 \times Vref1/I97,$$

where t_g is a pulse width of the gate pulse S97B, C97 is a capacitance, Vref1 is a constant voltage, and I97 is a constant current.

The monostable multivibrator 97 shown in FIG. 13 stabilizes a pulse width of an audio signal received in an IrDA device.

Further, a receiving circuit is disclosed which has been known as avoiding generation of unwanted pulses caused by a variation in voltage of an outputted signal (see Japanese Unexamined Patent Publication No. 130088/2005 (Tokukai 2005-130088, publication date: May 19, 2005 (Patent Document 2)).

However, the monostable multivibrator 97 shown in FIGS. 13 and 14 has a problem in that a pulse width is constant and cannot be expanded or compressed for adjustment, although it is capable of stabilizing a pulse width.

Further, in the infrared communication receiver 90 described with reference to FIGS. 10 through 12, a pulse width is merely expanded to be larger than an input pulse width and cannot be compressed. Thus, the infrared communication receiver 90 cannot reduce an acoustic pressure of a speaker by compressing a pulse width. Further, the infrared communication receiver 90 requires the pulse width expanding section 94 as well as the receiving section 92 (IrDA device). This causes an increase in the number of components, further causing difficulty in downsizing.

SUMMARY OF THE INVENTION

The present invention is made in view of the foregoing problems, and an object of the invention is to provide an infrared communication receiver that is capable of adjusting and decreasing an acoustic pressure of a speaker driven based on an audio signal.

To attain the above object, an infrared communication receiver of the present invention includes: receiving means for receiving via infrared communication an audio signal representing audio data; and speaker driving means for driving a speaker based on the audio signal received by the receiving means the receiving means including: a receiving block for receiving the audio signal; and pulse width expanding and compressing means for expanding or compressing a pulse width of the audio signal received by the receiving block.

According to the arrangement, the pulse width expanding and compressing means expands or compresses a pulse width of an audio signal received by the receiving block in the infrared communication receiver. This enables a pulse width to be compressed, as well as to be expanded as in the conventional art. Thus, it is possible to increase and also decrease an acoustic pressure of a speaker.

Further, the pulse width expanding and compressing means is provided as an integrated circuit in the receiving means. This reduces the number of components. Specifically, compared with the conventional structure constituted by (i) receiving means, (ii) pulse width expanding means, (iii) speaker driving means, and (iv) a speaker, the pulse width expanding and compressing means is constituted by (i) receiving means, (ii) speaker driving means, and (iii) a speaker, which are realized by integrated circuits, reducing the number of components.

Additional objects, features, and strengths of the present invention will be made clear by the description below. Further, the advantages of the present invention will be evident from the following explanation in reference to the drawings.

DESCRIPTION OF THE EMBODIMENTS

Referring to FIGS. 1 through 9, the following will describe one embodiment of the present invention.

First Embodiment

Figure 1:
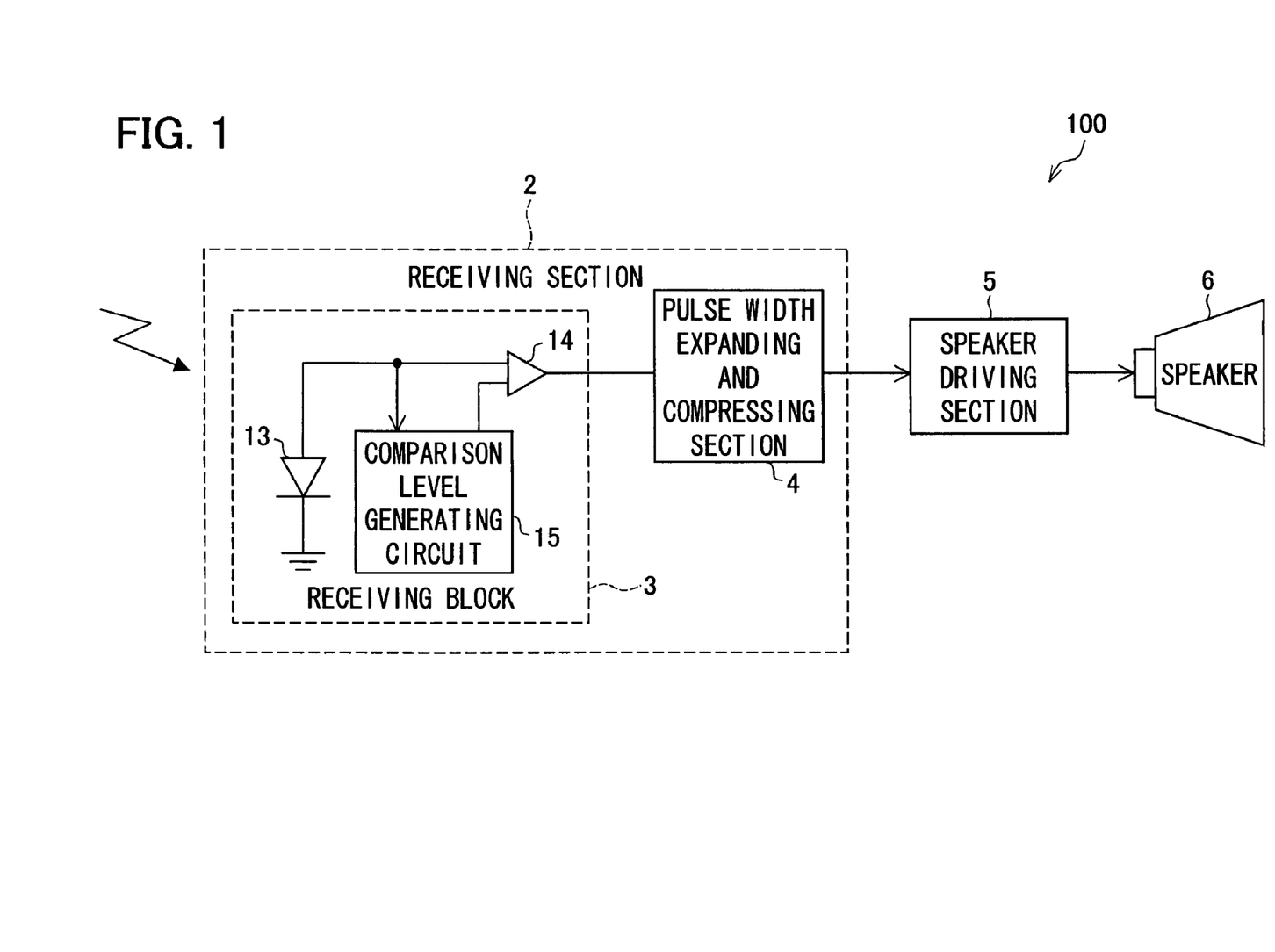
FIG. 1 is a block diagram illustrating an infrared communication receiver according to one embodiment of the present invention.

Referring to FIGS. 1 through 8, the following will describe one embodiment of the present invention. FIG. 1 is a block diagram illustrating one embodiment of an infrared communication receiver 100 according to the present invention. The infrared communication receiver 100 includes a receiving section 2 for receiving via infrared communication an audio signal which represents audio data. The receiving section 2 includes a receiving block 3 and a pulse width expanding and compressing section 4. The receiving block 3 includes an infrared LED 13, a voltage comparator 14, and a comparison level generating circuit 15.

The infrared communication receiver 100 includes a speaker driving section 5. The speaker driving section 5 drives a speaker 6, based on an audio signal received by the receiving section 2.

The infrared communication receiver 100 is an IrDA receiving device, for example. The infrared communication receiver 100 is preferably an IrDA receiving device that meets (i) a specification defining a communication rate 1.152 Mbps (MIR), a pulse width (¼)×T, T=868 nsec, (ii) a specification defining a communication rate 4 Mbps (FIR), a pulse width (¼)×T, T=500 nsec, or (iii) a specification defining a communication rate 2.4 kbps to 115.2 kbps (SIR), a pulse width (3/16)×T, T=8.68 µsec to 104 µsec.

Figure 2:
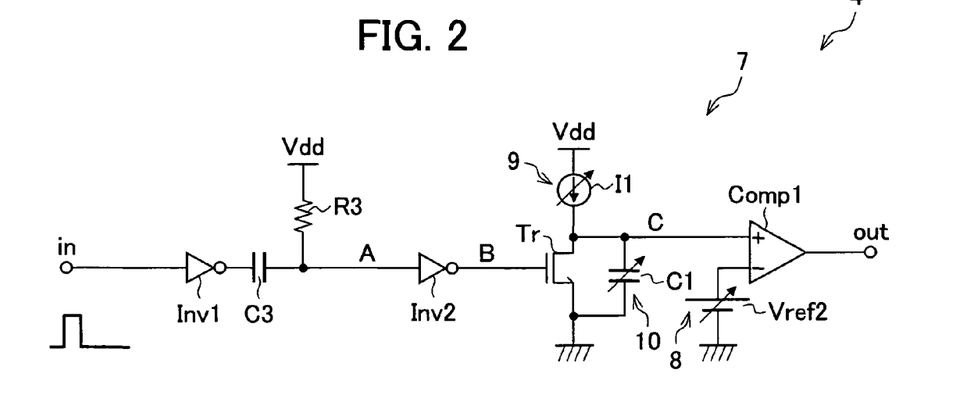
FIG. 2 is a diagram illustrating a circuitry of a pulse width expanding and compressing section provided in the infrared communication receiver.

FIG. 2 is a diagram illustrating a circuitry of a pulse width expanding and compressing section 4. The pulse width expanding and compressing section 4 is constituted by a monostable multivibrator 7. The monostable multivibrator 7 includes an inverter Inv1 via which an audio signal is supplied. The output of the inverter Inv1 is connected to a capacitor C3. Opposite the inverter Inv1 relative to the capacitor C3, an inverter Inv2 and a resistor R3 are mutually connected in parallel. Further, at an opposed location to the capacitor 3, the resister R3 is connected to a terminal via which a power supply voltage Vdd is supplied.

On the output side of the inverter Inv2 are provided a transistor Tr, a variable current supplying circuit 9 for adjustment-use, a variable capacitor 10, and a comparator Comp1. The variable current supplying circuit 9 for adjustment-use supplies a variable current I1, and the variable capacitor 10 has a variable capacitance C1. A drain of the transistor Tr, one end of the variable current supplying circuit 9 for adjustment-use, one end of the variable capacitor 10, and a non-inverting input terminal of the comparator Comp1 are connected to one another through a line C. The other end of the variable current supplying circuit 9 for adjustment-use is connected to a terminal via which a power supply voltage Vdd is supplied, and the other end of the variable capacitor 10 and a source of the transistor Tr are connected to ground. Further, an inverting input terminal of the comparator Comp1 is connected to a variable voltage supplying circuit 8 for adjustment-use, which supplies a variable voltage Vref2.

Figure 3:
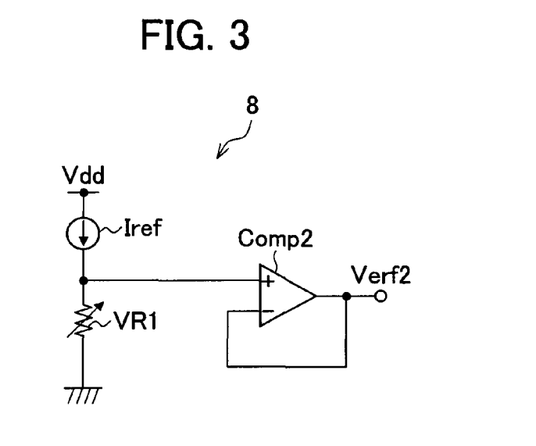
FIG. 3 is a circuit diagram illustrating a schematic of a constant voltage circuit for adjustment-use provided in the pulse width expanding and compressing section.

FIG. 3 is a circuit diagram illustrating a schematic of the variable voltage supplying circuit 8 for adjustment-use. The variable voltage supplying circuit 8 for adjustment-use includes a comparator Comp2. The comparator Comp2 has a non-inverting input terminal connected to (i) a constant current source that supplies a constant current Iref and (ii) a variable resistor VR1. The constant current source and the variable resistor VR1 are mutually connected in parallel. At an opposed location to the comparator Comp2, the constant current source is connected to a terminal via which a power supply voltage Vdd is supplied. Further, the variable resistor VR1 is connected to the ground at an opposed location to the comparator Comp2. The output of the comparator Comp2 is connected to its inverting input terminal.

A variable voltage Vref2 outputted from the comparator Comp2 is found by the following equation:

$$Vref2 = Iref \times VR1,$$

where Iref is a constant current and VR1 is a variable resistance.

As such, by using Iref as a constant current and varying the variable resistance VR1, it is possible to adjust the variable voltage Vref2.

Figure 4:
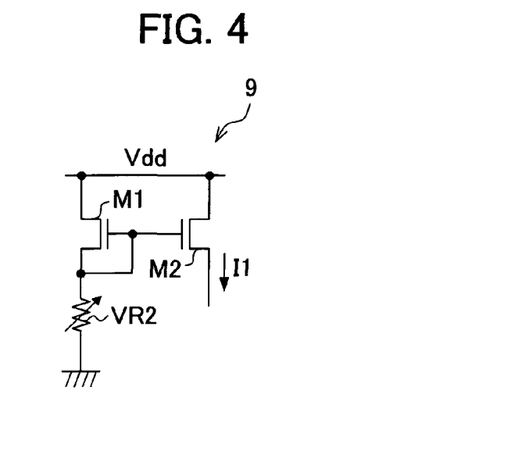
FIG. 4 is a circuit diagram illustrating a schematic of a constant current circuit for adjustment-use provided in the pulse width expanding and compressing section.

FIG. 4 is a circuit diagram illustrating a schematic of the variable current supplying circuit 9 for adjustment-use. The variable current supplying circuit 9 for adjustment-use includes transistors M1 and V2, whose gates are connected to each other. Sources of the transistors M1 and M2 are respectively connected to terminals via which a power supply voltage Vdd is supplied. Further, a drain and the gate of the transistor M1 and the gate of the transistor M2 are connected to a variable resistor VR2. At an opposed location to the transistor M1, the variable resistor VR2 is connected to ground.

A variable current I1 supplied via the drain of the transistor M2 is defined by the following equation:

$$I1 = (Vdd - Vgs1)/VR2,$$

where Vgs1 is a voltage between the gate and the source of the transistor M1.

As such, by varying the variable resistor VR2, it is possible to adjust the variable current I1.

Figure 5:
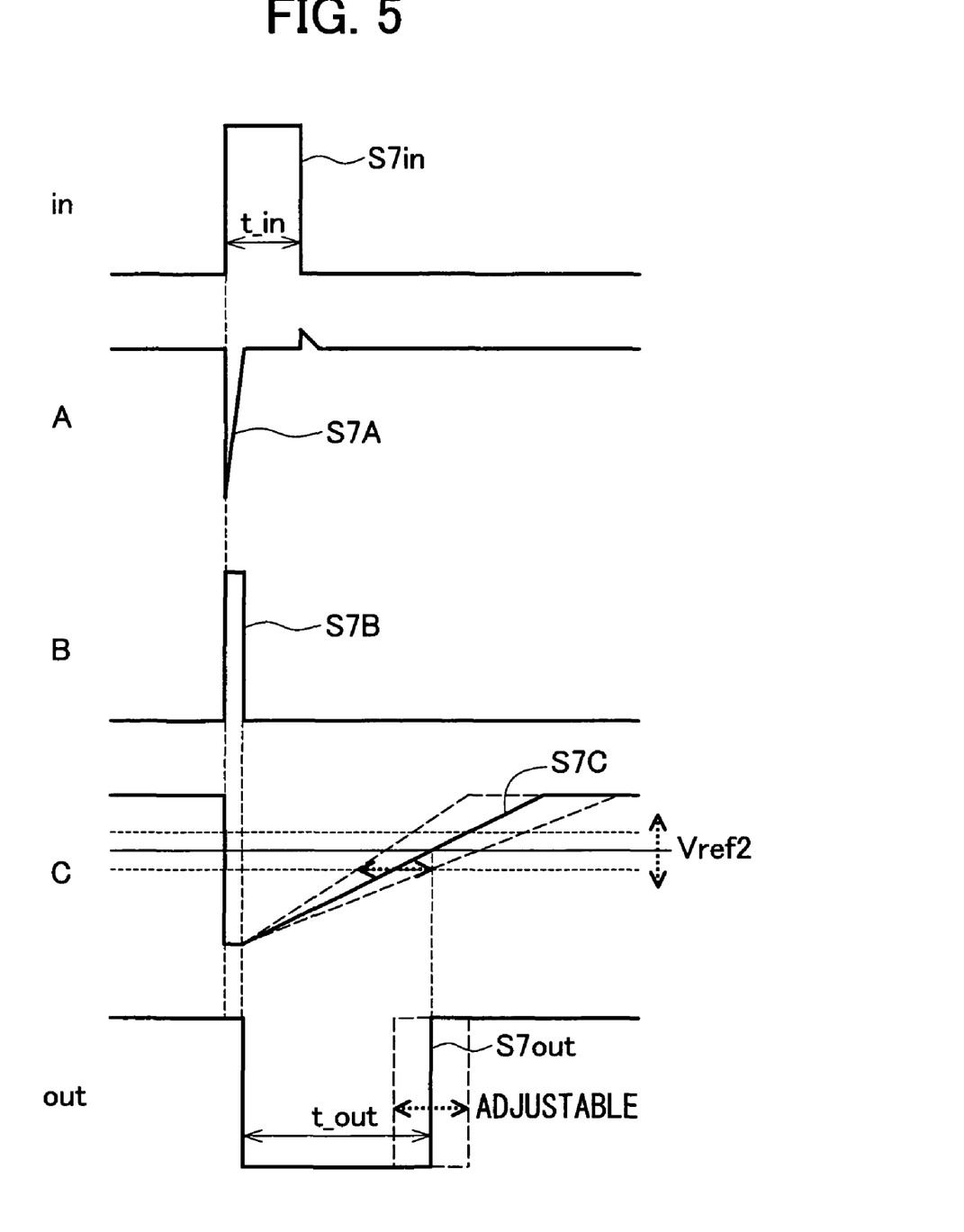
FIG. 5 is a wave form chart representing operation of the pulse width expanding and compressing section.

FIG. 5 is a wave form chart representing operation of the monostable multivibrator 7 that constitutes the pulse width expanding and compressing section 4. When an audio signal S7in having a pulse width t_in is supplied to the inverter Inv1, a rising edge of an input pulse of the audio signal S7in is detected by a highpass filter constituted by the capacitor C3 and the resistor R3, and a pulse signal S7A is outputted to the inverter Inv2 through the line A. Based on the pulse signal S7A, the inverter Inv2 generates a gate pulse S7B, and outputs it to a gate of the transistor Tr. In response to the gate pulse S7B as a switch, a signal S7C represented in FIG. 5 is supplied to the non-inverting input terminal of the comparator Comp1 through the line C. Then, the comparator Comp1 compares the signal S7C with the variable voltage Vref2, so as to generate a signal S7out having a pulse width t_out. The pulse width t_out is found by the following equation:

$$\text{Pulse width } t\_out = tg + C1 \times Vref2/I1,$$

where t_g is a pulse width of the gate pulse S7B, C1 is a variable capacitance for adjustment-use, Vref2 is a variable voltage for adjustment-use, and I1 is a variable current for adjustment-use.

By varying the variable voltage Vref2, the intersection of the variable voltage Vref2 and the signal S7C moves, so that the pulse width t_out of the signal S7out can be adjusted. For example, when the variable voltage Vref2 is reduced by manually operating a volume tuning knob, the intersection of the variable voltage Vref2 and the signal S7C moves lower leftward in FIG. 5, so that the pulse width t_out of the signal S7out can be compressed. When the variable voltage Vref2 is increased, the intersection of the variable voltage Vref2 and the signal S7C moves upper rightward in FIG. 5, so that the pulse width t_out can be expanded.

Alternatively, by varying either the variable current I1 or the variable capacitance C1, it is possible to change the inclination of the waveform of the signal S7C. This causes the intersection of the signal S7C and the variable voltage Vref2 to move, enabling to expand or compress the pulse width t_out.

For example, when the variable current I1 is increased, the inclination of the signal S7C is increased, and the intersection of the signal S7C and the variable voltage Vref2 moves leftward in FIG. 5. This enables the pulse width t_out to be compressed. When the variable current I1 is decreased, the inclination of the signal S7C is reduced, and the intersection of the signal S7C and the variable voltage Vref2 moves rightward. This enables the pulse width t_out to be expanded.

Alternatively, when the variable capacitance C1 is increased, the inclination of the signal S7C is reduced, and the intersection of the variable capacitance C1 and the variable voltage Vref2 moves rightward. This enables the pulse width t_out to be expanded. When the variable capacitance C1 is decreased, the inclination of the signal S7C is increased, and the intersection of the variable capacitance C1 and the variable voltage Vref2 moves leftward. This enables the pulse width t_out to be compressed.

As such, by varying any one of the variable capacitance C1, the variable current I1, and the variable voltage Vref2, it is possible to adjust the pulse width t_out of the signal S7out.

Further, in the equation, tg of the first term is generally negligible compared with the second term $C1 \times Vref2/I1$. In this case, the pulse width t_out is proportional to the variable capacitance C1 and to the variable voltage Vref2. Thus, the pulse width can be easily adjusted.

According to the present embodiment, it is possible to output a signal having a pulse width being narrower than the pulse width t_in of the audio signal S7in, which is supplied to the monostable multivibrator 7. This enables the audio signal to be adjusted in a direction in which the acoustic pressure is reduced.

Figure 6:
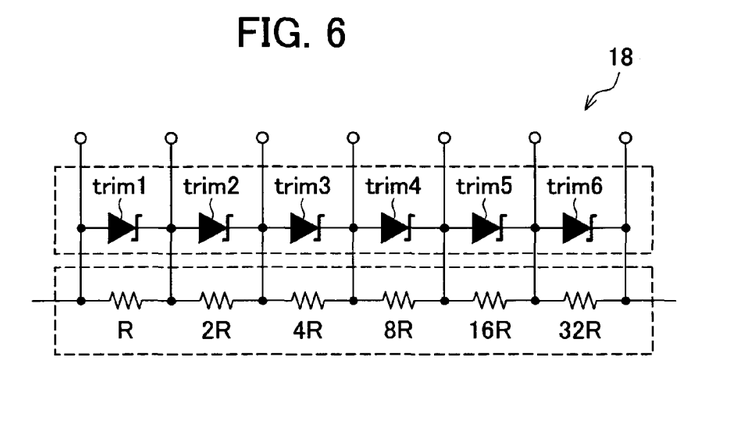
FIG. 6 is a circuit diagram illustrating an arrangement of a trimming circuit for adjustment-use provided in the pulse width expanding and compressing section.

FIG. 6 is a circuit diagram illustrating an arrangement of a trimming circuit 18 for adjustment-use, which is provided in the monostable multivibrator 7 of the pulse width expanding and compressing section 4. The variable resistor VR1 in the variable voltage supplying circuit 8 for adjustment-use and the variable resistor VR2 in the variable current supplying circuit 9 for adjustment-use can be constituted by the trimming circuit 18 for adjustment-use. In the trimming circuit 18 for adjustment-use, a resistance expressed by $R \times 2^n$ can be obtained according to a trimming bit number n. When trimming devices, i.e., trim 1, trim 2, trim 3, trim 4, trim 5, and trim 6, are adjusted by being switching on, off, on, off, on, and off, respectively, a resistance of the trimming circuit 18 for adjustment-use can be found by the following equation:

$2R+8R+32R=42R$.

In the case where the trimming device is switched on, the trimming device is shorted, while in the case where the trimming device is turned off, the trimming device is opened.

Examples of known methods for trimming such trimming devices that can be built in an IC include a polysilicon laser trimming, a polysilicon fusion trimming, a zener diode trimming, and the like.

Figure 7:
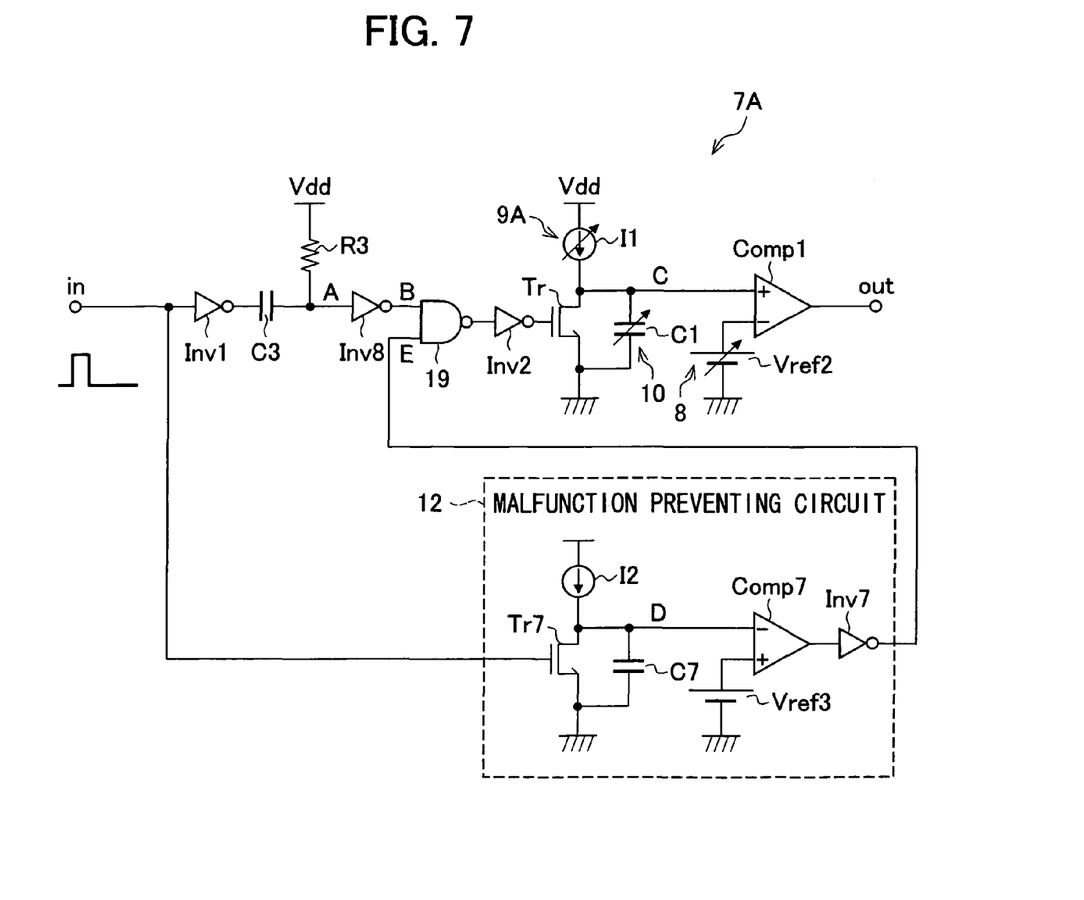
FIG. 7 is a circuit diagram illustrating modification example of the pulse width expanding and compressing section.
Figure 8:
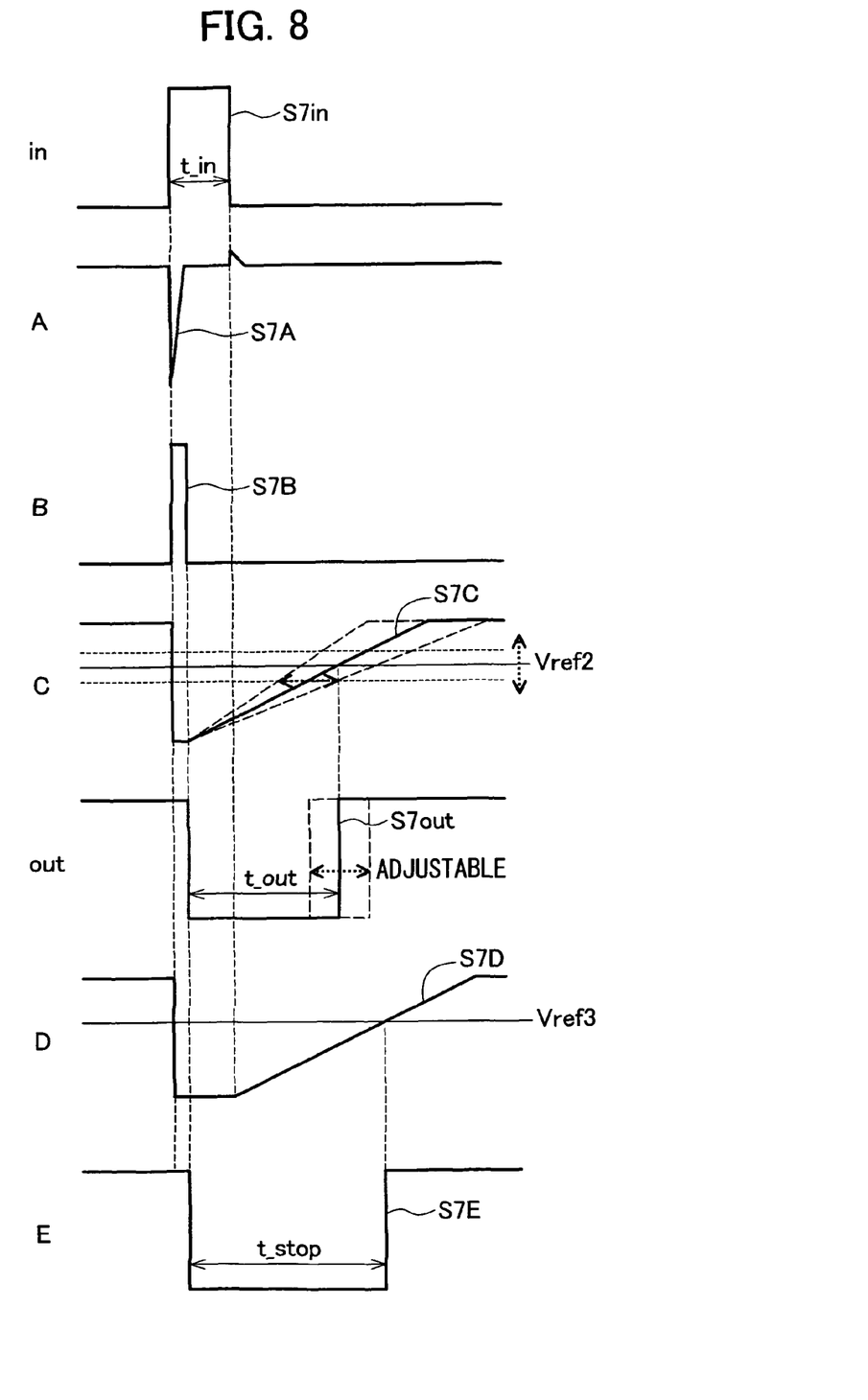
FIG. 8 is a wave form chart representing operation of the modification example of the pulse width expanding and compressing section.

FIG. 7 is a circuit diagram illustrating a modification example of the monostable multivibrator that constitutes the pulse width expanding and compressing section 4, and FIG. 8 is a wave form chart representing its operation. Constituting elements being the same as those described with reference to FIGS. 2 and 5 are indicated by the same reference numerals, and their detailed explanations are omitted.

A monostable multivibrator 7A includes a malfunction preventing circuit 12. The malfunction preventing circuit 12 includes a transistor Tr7, a constant current I2, a capacitor C7, a comparator Comp7, and an inverter Inv7. A drain of the transistor Tr7, one end of the constant current I2, one end of the capacitor C7, and an inverting input terminal of the comparator Comp7 are connected to one another through a line D. The other end of the constant current I2 is connected to a terminal via which a power supply voltage Vdd is supplied, and the other end of the capacitor C7 and a source of the transistor Tr7 are connected to ground. Further, a non-inverting input terminal of the comparator Comp7 is connected to a constant voltage source Vref3. An audio signal S7 in having a pulse width t_in is supplied via a gate of the transistor Tr7.

Between (i) the capacitor C3 and the resistor R3 and (ii) the inverter Inv2, an inverter Inv8 and a NAND circuit 19 are provided in this order. An output terminal of the inverter Inv8 is connected to one input terminal of the NAND circuit 19. Further, another input terminal of the NAND circuit 19 is connected to an output terminal of the inverter Inv7, provided in the malfunction preventing circuit 12.

When an audio signal S7 in having a pulse width of t_in is supplied to the gate of the transistor Tr7 in the malfunction preventing circuit 12, the signal S7D represented in FIG. 8 is supplied to the inverting input terminal of the comparator Comp7 through the line D. Then, the comparator Comp7 compares the signal S7D with the constant voltage source Vref3, generates a signal S7E having a pulse width t_stop, and outputs it to the another terminal of the NAND circuit 19. This enables prevention of malfunction during a certain period of time (time duration of the pulse width t_stop), after the gate pulse S7B is outputted.

It is possible also in the monostable multivibrator 7A having the above structure to expand or compress the pulse width t_out by varying any one of the variable capacitance C1, the variable current I1, and the variable voltage Vref2.

Figure 9:
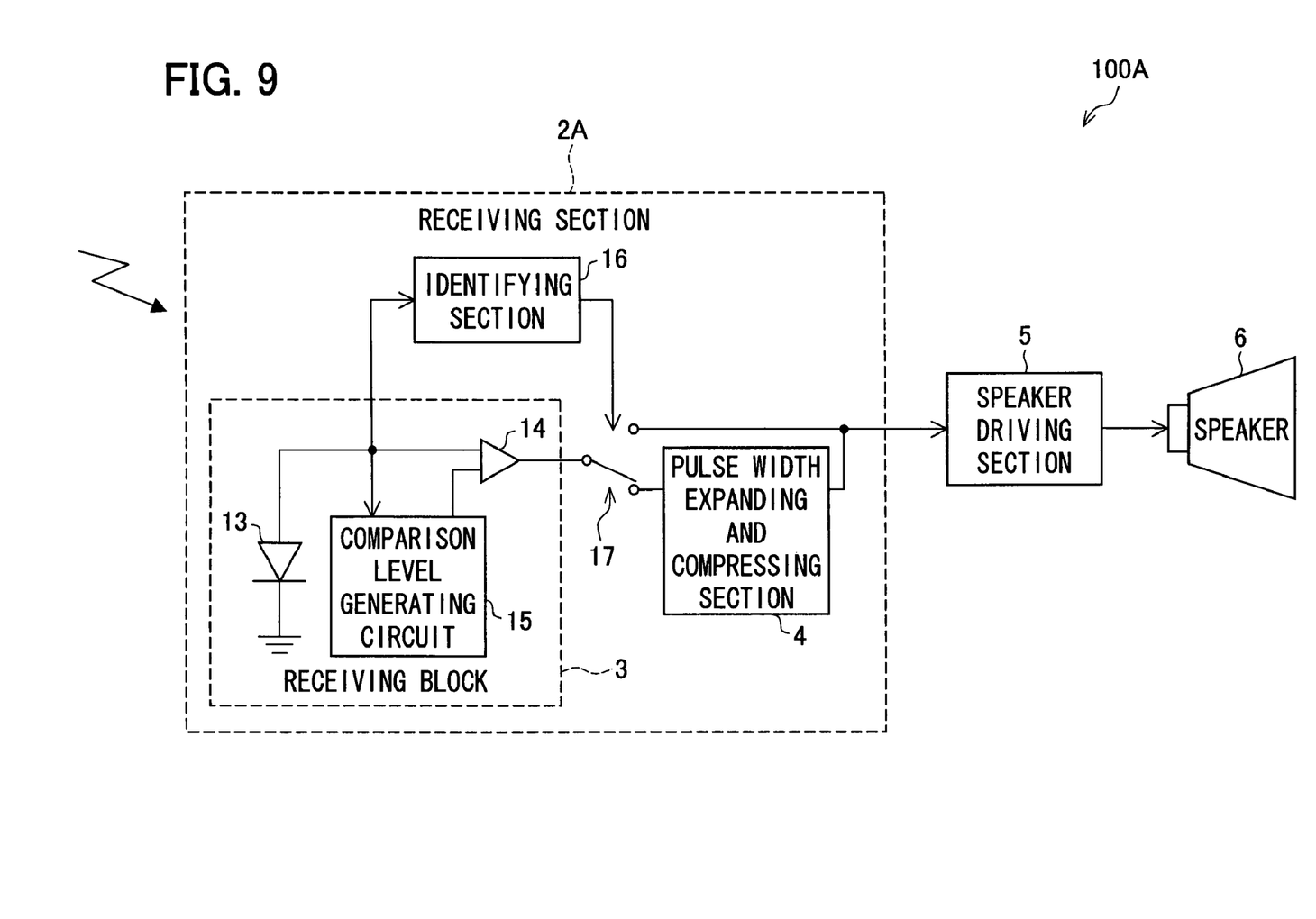
FIG. 9 is a block diagram illustrating another structure of the infrared communication receiver.

FIG. 9 is a block diagram illustrating another structure of the infrared communication receiver. Constituting elements being the same as those described with reference to FIG. 1 are indicated by the same reference numerals, and their detailed explanations are omitted.

An infrared communication receiver 100A includes a receiving section 2A having an identifying section 16. The identifying section 16 identifies whether data received by a receiving block 3 is 1 bit data array modulated by the PDM method, or IrDA data. The receiving section 2A has a mode selection switch 17. Based on the result of identification carried out by the identifying section 16, the mode selection switch 17 switches a receiver of an output from a voltage comparator 14, provided in the receiving block 3. When the identifying section 16 identifies that the data thus received is 1 bit data array modulated by the PDM method, the mode selection switch 17 switches the receiver of an output from the voltage comparator 14 to the pulse width expanding and compressing section 4. In the case of IrDA data, since IrDA data has a preamble period prior to transmission of the data, identification of a device and the like are carried out during the preamble period. Further, according to the presence or absence of the preamble period, identification can be made as to whether or not given data is IrDA data. Since such identification cannot be carried out on "1 bit data array modulated by the PDM method" during the preamble period, "1 bit data array modulated by the PDM method" is distinguishable from IrDA data.

As such, with the mode selection switch 17 for switching between a mode for communicating audio data and a mode for communicating IrDA data, both audio data and IrDA data can be received by a single receiving device.

The present embodiment exemplifies an IrDA receiving device. However, the present invention is not limited to this example. For example, the present invention is applicable to devices for receiving infrared ray by remote control. In the devices for receiving infrared ray by remote control, a communication rate is less than 1 kbps, and a pulse width varies depending on a transmission code.

Further, the foregoing described a modification example of the monostable multivibrator 7 of the pulse width expanding and compressing section 4, in which a capacitance, a current, and a voltage are all variable. However, the present invention is not limited to this example. The monostable multivibrator 7 may be arranged such that at least any one of a capacitance, a current, and a voltage is variable.

The present invention is not limited to the description of the embodiment above, but may be altered within the scope of the claims. An embodiment based on a proper combination of technical means disclosed in different embodiments is encompassed in the technical scope of the present invention.

Further, the infrared communication receiver of the present embodiment may be arranged such that the audio data is constituted by 1 bit data array modulated by PDM method, the infrared communication receiver further includes a mode selection switch for switching between an audio data receiving mode and an IrDA data receiving mode depending on whether to receive the audio data or IrDA data, and the pulse width expanding and compressing means expands or compresses a pulse width of the audio signal, when the mode selection switch selects the audio data receiving mode.

According to the arrangement, both the audio data and the IrDA data can be received by a single device.

Further, in the infrared communication receiver of the present embodiment, it is preferable that the pulse width expanding and compressing means include a monostable multivibrator in which any one of a capacitance, a voltage, and a current is variable.

According to the arrangement, it is possible to expand or compress the pulse width of the audio signal with a simple structure.

In the infrared communication receiver of the present embodiment, it is preferable that the monostable multivibrator include a variable voltage supplying circuit for adjustment-use for expansion or compression of the pulse width of the audio signal.

According to the arrangement, the monostable multivibrator includes the variable voltage supplying circuit for adjustment-use constituted by the variable resistor, the current source, and the comparator. With such a simple structure, it is possible to expand or compress the pulse width of the audio signal.

In the infrared communication receiver of the present embodiment, it is preferable that the monostable multivibrator include a variable voltage supplying circuit for adjustment-use for expansion or compression of the pulse width of the audio signal.

According to the arrangement, the monostable multivibrator includes the variable current supplying circuit for adjustment-use constituted by the variable resistor and the two transistors. With such a simple structure, it is possible to expand or compress the pulse width of the audio signal.

In the infrared communication receiver of the present embodiment, it is preferable that the monostable multivibrator include a capacitor for adjustment-use for expansion or compression of the pulse width of the audio signal.

According to the arrangement, with the monostable multivibrator having the simple structure, it is possible to expand or compress the pulse width of the audio signal.

In the infrared communication receiver of the present embodiment, it is preferable that the monostable multivibrator include a trimming circuit for adjustment-use for expansion or compression of the pulse width of the audio signal.

According to the arrangement, the trimming circuit enables an audio signal to be expanded or compressed.

The present invention can be applied to infrared communication receivers, particularly to infrared communication receivers that receive audio data by wireless.

The embodiment and concrete examples of implementation discussed in the foregoing detailed explanation serve solely to illustrate the technical details of the present invention, which should not be narrowly interpreted within the limits of such embodiment and concrete examples, but rather may be applied in many variations within the spirit of the present invention, provided such variations do not exceed the scope of the patent claims set forth below.

What is claimed is:

1. An infrared communication receiver comprising:
    receiving means for receiving via infrared communication an audio signal representing audio data; and
    speaker driving means for driving a speaker based on the audio signal received by the receiving means;
    the receiving means including:
    a receiving block for receiving the audio signal; and
    pulse width expanding and compressing means for expanding or compressing a pulse width of the audio signal received by the receiving block, wherein:
    the audio data is constituted by 1 bit data array modulated by PDM method,
    the infrared communication receiver further comprises a mode selection switch for switching between an audio data receiving mode and an IrDA data receiving mode depending on whether to receive the audio data or IrDA data, and
    the pulse width expanding and compressing means expands or compresses a pulse width of the audio signal, when the mode selection switch selects the audio data receiving mode.

2. The infrared communication receiver according to claim 1, wherein the pulse width expanding and compressing means comprises a monostable multivibrator in which any one of a capacitance, a voltage, and a current is variable.

3. The infrared communication receiver according to claim 2, wherein the monostable multivibrator comprises a variable voltage supplying circuit for adjustment-use for expansion or compression of the pulse width of the audio signal.

4. The infrared communication receiver according to claim 2, wherein the monostable multivibrator comprises a variable current supplying circuit for adjustment-use for expansion or compression of the pulse width of the audio signal.

5. The infrared communication receiver according to claim 2, wherein the monostable multivibrator comprises a capacitor for adjustment-use for expansion or compression of the pulse width of the audio signal.

6. The infrared communication receiver according to claim 2, wherein the monostable multivibrator comprises a trimming circuit for adjustment-use for expansion or compression of the pulse width of the audio signal.

* * * * *